US010544649B2

(12) United States Patent
Pisklak et al.

(10) Patent No.: US 10,544,649 B2
(45) Date of Patent: *Jan. 28, 2020

(54) CEMENT SET ACTIVATORS FOR CEMENT COMPOSITIONS AND ASSOCIATED METHODS

(71) Applicant: Halliburton Energy Services, Inc., Houston, TX (US)

(72) Inventors: Thomas Jason Pisklak, Cypress, TX (US); Lance Everett Brothers, Chickasha, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/058,369

(22) Filed: Aug. 8, 2018

(65) Prior Publication Data

US 2018/0347310 A1 Dec. 6, 2018

Related U.S. Application Data

(60) Division of application No. 14/048,463, filed on Oct. 8, 2013, now Pat. No. 10,082,001, which is a continuation-in-part of application No. 13/417,001, filed on Mar. 9, 2012, now Pat. No. 8,851,173.

(60) Provisional application No. 61/875,231, filed on Sep. 9, 2013.

(51) Int. Cl.
E21B 33/138 (2006.01)
C04B 7/34 (2006.01)
C04B 28/18 (2006.01)
C04B 40/06 (2006.01)
C09K 8/467 (2006.01)

(52) U.S. Cl.
CPC .............. E21B 33/138 (2013.01); C04B 7/34 (2013.01); C04B 28/18 (2013.01); C04B 40/0658 (2013.01); C09K 8/467 (2013.01); Y02W 30/92 (2015.05); Y02W 30/94 (2015.05)

(58) Field of Classification Search
CPC ....... C04B 7/34; C04B 28/18; C04B 40/0658; C09K 8/467; E21B 33/138
See application file for complete search history.

(56) References Cited

U.S. PATENT DOCUMENTS

| | | | |
|---|---|---|---|
| 2,411,793 A | 11/1946 | Kennedy | |
| 2,848,051 A | 8/1958 | Williams | |
| 3,238,279 A | 3/1966 | Tarlton | |
| 3,557,876 A | 1/1971 | Tragesser | |
| 3,699,042 A | 10/1972 | Browning et al. | |
| 3,887,009 A | 6/1975 | Miller et al. | |
| 3,959,003 A | 5/1976 | Ostroot et al. | |
| 4,054,432 A | 10/1977 | Stude | |
| 4,054,462 A | 10/1977 | Stude et al. | |
| 4,349,443 A | 9/1982 | Block | |
| 4,350,533 A | 9/1982 | Galer et al. | |
| 4,462,837 A | 7/1984 | Baker et al. | |
| 4,515,216 A | 5/1985 | Childs et al. | |
| 4,519,452 A | 5/1985 | Tsao et al. | |
| 4,524,828 A | 5/1985 | Sabins et al. | |
| 4,676,832 A | 6/1987 | Chidls et al. | |
| 4,818,288 A | 4/1989 | Aignesberger | |
| 4,875,937 A | 10/1989 | Viles | |
| 4,961,536 A | 10/1990 | Correard | |
| 5,058,679 A | 10/1991 | Hale et al. | |
| 5,263,542 A | 11/1993 | Brothers | |
| 5,314,022 A | 5/1994 | Cowan et al. | |
| 5,407,299 A | 4/1995 | Sutton | |
| 5,439,318 A | 8/1995 | Stark | |
| 5,447,197 A | 9/1995 | Rae et al. | |
| 5,501,277 A | 3/1996 | Onan | |
| 5,503,671 A | 4/1996 | Casabonne et al. | |
| 5,547,506 A | 8/1996 | Rae et al. | |
| 6,173,778 B1 | 1/2001 | Rae et al. | |
| 6,221,148 B1 | 4/2001 | Mathur et al. | |
| 6,333,005 B1 | 12/2001 | Nguyen et al. | |
| 6,457,523 B1 | 10/2002 | Vijn et al. | |
| 6,488,088 B1 | 12/2002 | Kohli et al. | |
| 6,488,762 B1 | 12/2002 | Shi | |
| 6,610,140 B2 | 8/2003 | Vijn et al. | |
| 6,907,928 B2 | 6/2005 | Di Lullo Arias et al. | |
| 6,908,508 B2 | 6/2005 | Brothers | |
| 7,086,466 B2 | 8/2006 | Roddy et al. | |
| 7,201,798 B2 | 4/2007 | Brothers et al. | |
| 7,199,086 B1 | 6/2007 | Roddy et al. | |
| 7,244,303 B2 | 7/2007 | Chatterji et al. | |
| 7,338,923 B2 | 3/2008 | Roddy et al. | |
| 7,445,669 B2 | 11/2008 | Roddy et al. | |
| 7,478,675 B2 | 1/2009 | Roddy et al. | |
| 7,559,369 B2 | 7/2009 | Roddy et al. | |
| 7,572,329 B2 | 8/2009 | Liu et al. | |
| 7,575,055 B2 | 8/2009 | Reddy et al. | |
| 7,617,870 B1 | 11/2009 | Roddy et al. | |

(Continued)

FOREIGN PATENT DOCUMENTS

AU 2016223251 9/2016
EP 2822914 9/2018

(Continued)

OTHER PUBLICATIONS

"How Microsilica Improves Concrete", Publication #C850327 Copyright 1985, The Aberdeen Group.

(Continued)

Primary Examiner — Anthony J Green
(74) Attorney, Agent, or Firm — Thomas Rooney; C. Tumey Law Group PLLC

(57) ABSTRACT

Disclosed herein are cement compositions and methods of using cement compositions in subterranean formations. An embodiment comprises a method of cementing in a subterranean formation comprising: providing a cement composition comprising water, a pozzolan, hydrated lime, and a zeolite activator; introducing the cement composition into a subterranean formation; and allowing the cement composition to set in the subterranean formation, wherein the zeolite activator accelerates compressive strength development of the cement composition.

15 Claims, 2 Drawing Sheets

(56) References Cited

U.S. PATENT DOCUMENTS

| | | |
|---|---|---|
| 7,670,427 B2 | 3/2010 | Perez-Pena |
| 7,674,332 B2 | 3/2010 | Roddy et al. |
| 7,743,828 B2 | 6/2010 | Roddy et al. |
| 7,784,542 B2 | 8/2010 | Roddy et al. |
| 7,789,150 B2 | 9/2010 | Roddy et al. |
| 7,806,183 B2 | 10/2010 | Roddy et al. |
| 7,836,954 B2 | 11/2010 | Morgan et al. |
| 7,855,170 B2 | 12/2010 | Perera et al. |
| 7,863,224 B2 | 1/2011 | Keys et al. |
| 7,867,954 B2 | 1/2011 | Warrender et al. |
| 7,892,352 B2 | 2/2011 | Roddy et al. |
| 7,984,538 B2 | 6/2011 | Perera et al. |
| 8,038,790 B1 | 10/2011 | Dubey et al. |
| 8,048,219 B2 | 11/2011 | Woolfsmith |
| 8,183,186 B2 | 5/2012 | Luo |
| 8,281,859 B2 | 10/2012 | Roddy et al. |
| 8,297,357 B2 | 10/2012 | Brenneis et al. |
| 8,307,899 B2 | 11/2012 | Brenneis et al. |
| 8,403,045 B2 | 3/2013 | Brenneis et al. |
| 8,476,203 B2 | 7/2013 | Patil |
| 8,486,869 B2 | 7/2013 | Brenneis et al. |
| 8,851,173 B2 | 10/2014 | Brothers et al. |
| 8,899,329 B2 | 12/2014 | Chatterji et al. |
| 8,910,708 B2 | 12/2014 | Chatterji et al. |
| 9,212,534 B2 | 12/2015 | Ballew |
| 9,255,031 B2 | 2/2016 | Pisklak |
| 9,255,454 B2 | 2/2016 | Lewis et al. |
| 9,260,343 B2 | 2/2016 | Brothers |
| 9,328,281 B2 | 5/2016 | Agapiou |
| 9,328,583 B2 * | 5/2016 | Pisklak .............. C04B 28/18 |
| 9,363,209 B1 | 6/2016 | Akins et al. |
| 9,534,165 B2 * | 1/2017 | Agapiou .............. C04B 28/18 |
| 9,580,638 B2 | 2/2017 | Boul |
| 9,790,132 B2 * | 10/2017 | Pisklak .............. C04B 41/0018 |
| 9,840,653 B2 * | 12/2017 | Chatterji .............. C04B 22/00 |
| 9,856,167 B2 | 1/2018 | Lewis et al. |
| 9,878,949 B2 * | 1/2018 | Pisklak .............. C04B 28/18 |
| 9,903,177 B2 * | 2/2018 | Agapiou .............. C04B 28/18 |
| 10,082,001 B2 * | 9/2018 | Pisklak .............. C04B 28/18 |
| 2002/0009622 A1 | 1/2002 | Goodson |
| 2002/0050232 A1 | 5/2002 | Yamashita et al. |
| 2002/0162657 A1 | 11/2002 | Tumlin et al. |
| 2003/0120456 A1 | 7/2003 | Griffith et al. |
| 2003/0188669 A1 | 10/2003 | Sobolev et al. |
| 2003/0221778 A1 | 12/2003 | Musch et al. |
| 2004/0112600 A1 | 6/2004 | Luke et al. |
| 2004/0211342 A1 | 6/2004 | Sprouts et al. |
| 2004/0127606 A1 | 7/2004 | George et al. |
| 2004/0226484 A1 | 11/2004 | Chatterji et al. |
| 2005/0079016 A1 | 4/2005 | Greenwood et al. |
| 2006/0025312 A1 | 2/2006 | Santra |
| 2006/0041060 A1 | 2/2006 | Constantz et al. |
| 2006/0054320 A1 | 3/2006 | Brothers et al. |
| 2006/0166834 A1 | 7/2006 | Roddy et al. |
| 2006/0249054 A1 | 11/2006 | Brothers et al. |
| 2006/0249289 A1 | 11/2006 | Brothers et al. |
| 2007/0051280 A1 | 3/2007 | Fyten |
| 2007/0054059 A1 | 3/2007 | Nakashima et al. |
| 2007/0056475 A1 | 3/2007 | Roddy |
| 2007/0089643 A1 | 4/2007 | Roddy et al. |
| 2007/0125534 A1 | 6/2007 | Roddy et al. |
| 2007/0235192 A1 | 10/2007 | Michaux et al. |
| 2007/0289744 A1 | 12/2007 | Bingamon et al. |
| 2008/0066652 A1 | 3/2008 | Fraser et al. |
| 2008/0169100 A1 | 7/2008 | Lewis et al. |
| 2009/0011207 A1 | 1/2009 | Dubey |
| 2009/0020044 A1 | 1/2009 | Constantz et al. |
| 2009/0038800 A1 | 2/2009 | Ravi et al. |
| 2009/0105099 A1 | 4/2009 | Warrender et al. |
| 2009/0124522 A1 | 5/2009 | Roddy |
| 2010/0016183 A1 | 1/2010 | Roddy et al. |
| 2010/0025039 A1 | 2/2010 | Roddy et al. |
| 2010/0041792 A1 | 2/2010 | Roddy et al. |
| 2010/0044043 A1 | 2/2010 | Roddy et al. |
| 2010/0258312 A1 | 10/2010 | Brenneis et al. |
| 2010/0270016 A1 | 10/2010 | Carelli et al. |
| 2010/0273912 A1 | 10/2010 | Roddy et al. |
| 2010/0282466 A1 | 11/2010 | Brenneis et al. |
| 2010/0292365 A1 | 11/2010 | Roddy |
| 2010/0313795 A1 | 12/2010 | Guynn et al. |
| 2011/0017452 A1 | 1/2011 | Benkley et al. |
| 2011/0132605 A1 | 6/2011 | Sarap et al. |
| 2011/0162845 A1 | 7/2011 | Ravi |
| 2011/0290493 A1 | 12/2011 | James |
| 2011/0305830 A1 | 12/2011 | Frantz et al. |
| 2012/0018155 A1 | 1/2012 | Patil |
| 2012/0167803 A1 | 7/2012 | Luo |
| 2012/0186494 A1 | 7/2012 | Patil |
| 2012/0192768 A1 | 8/2012 | Ravi |
| 2012/0211227 A1 | 8/2012 | Thaemiltz |
| 2012/0214901 A1 | 8/2012 | Bury |
| 2012/0249552 A1 | 10/2012 | Harvill et al. |
| 2012/0251079 A1 | 10/2012 | Meschter et al. |
| 2012/0252304 A1 | 10/2012 | Vaughn |
| 2012/0291674 A1 | 11/2012 | Brenneis et al. |
| 2012/0325478 A1 | 12/2012 | Muthusamy et al. |
| 2013/0233550 A1 | 9/2013 | Brothers et al. |
| 2013/0248183 A1 | 9/2013 | Pisklak |
| 2014/0083701 A1 | 3/2014 | Boul et al. |
| 2014/0090843 A1 | 4/2014 | Boul et al. |
| 2014/0190696 A1 | 7/2014 | Iverson |
| 2014/0318419 A1 | 10/2014 | Chatterji et al. |
| 2015/0175481 A1 | 6/2015 | Pisklak |
| 2015/0175869 A1 | 6/2015 | Agapiou |
| 2015/0197033 A1 | 7/2015 | Agapiou |
| 2015/0197453 A1 | 7/2015 | Pisklak |

FOREIGN PATENT DOCUMENTS

| | | |
|---|---|---|
| WO | 2011161411 | 12/2011 |
| WO | 2013134456 | 9/2013 |
| WO | 2015034477 | 3/2015 |

OTHER PUBLICATIONS

Non-Final Rejection for Application No. 15087961 dated Apr. 17, 2017.

Additives to Concretes and Building Mortars by L.I. Kastomykh, 2007.

Russian Office Action for Application No. 2016105974 dated May 17, 2017.

Non-Final rejection for U.S. Appl. No. 15/162,245 dated Apr. 21, 2017.

Non-Final Official Action for U.S. Appl. No. 14/478,813 dated Sep. 10, 2015.

Non-Final Official Action for U.S. Appl. No. 14/090,494 dated Sep. 24, 2015.

Non-Final Official Action for U.S. Appl. No. 14/221,479 dated Sep. 30, 2015.

Non-Final Official Action for U.S. Appl. No. 14/194,125 dated Oct. 16, 2015.

Non-Final Official Action for U.S. Appl. No. 14/032,734 dated Sep. 24, 2015.

Non-Final Official Action for U.S. Appl. No. 14/202,625 dated Oct. 21, 2015.

Final Official Action for U.S. Appl. No. 14/098,198 dated Jun. 19, 2015.

Non-Final Official Action for U.S. Appl. No. 14/090,573 dated Jun. 12, 2015.

Final Official Action for U.S. Appl. No. 14/478,869 dated Jun. 17, 2015.

Official Action for U.S. Appl. No. 13/854,115 dated Jul. 15, 2015.

Final Official Action for U.S. Appl. No. 14/067,143 dated Aug. 12, 2015.

Official Action for U.S. Appl. No. 14/019,730 dated Jun. 3, 2015.

Official Action for U.S. Appl. No. 14/048,486 dated Aug. 17, 2015.

AkzoNobel Colloidal Silica, "Perspectives on Colloidal Silica," https:/www-aksonobel.com/colloidalsilica/silica-Facts/perpectives, Jul. 9, 2015.

(56) References Cited

OTHER PUBLICATIONS

Final Official Action for U.S. Appl. No. 14/019,730 dated Sep. 23, 2015.
International Search Report and Written Opinion for PCT/US15/21837 dated Jun. 23, 2015.
International Search Report and Written Opinion for PCT/US2015/017564 dated Jun. 6, 2015.
International Search Report and Written Opinion for PCT/US2015/019709 dated May 22, 2015.
Official Action for U.S. Appl. No. 14/478,869 dated Feb. 26, 2015.
Official Action for U.S. Appl. No. 14/098,198 dated Nov. 20, 2014.
Official Action for U.S. Appl. No. 14/067,143 dated Mar. 12, 2015.
Search Report and Written Opinion for international Application PCT/US14/054791 dated Sep. 9, 2014.
Search Report and Written Opinion for International Application PCT/US14/054799 dated Sep. 9, 2014.
Search Report and Written Opinion for International Application PCT/US14/054497 dated Sep. 8, 2014.
Search Report and Written Opinion for International Application PCT/US14/04794 dated Sep. 9, 2014.
Search Report and Written Opinion for International Application PCT/US14/054496 dated Sep. 8, 2014.
Search Report and Written Opinion for International Application PCT/US14/054380 dated Sep. 5, 2014.
Search Report and Written Opinion for international Application PCT/US14/067112 dated Mar. 5, 2015.
Search Report and Written Opinion for International Application PCT/US14/068804 dated Mar. 17, 2015.
Notice of Allowance for U.S. Appl. No. 13/417,001 dated Mar. 9, 2012.
Search report and Written Opinion for International Application No. PCT/US2014/032015 dated Aug. 21, 2014.
U.S. Office Action for U.S. Appl. No. 13/417,001 dated Apr. 16, 2014.
HES Brochure Enhancer 932 Cement Agent, H07745 Jun. 2010.
Ramy N. Eid, Liquid Cement: Changing the Paradigm, Society of Petroleum Engineers, Apr. 15, 2007.
Benge et al., "Deep Gas-Well Cementation: A Review of Risks and Design Basis for Use of a Liquid Cement Premix for. Large Offshore Cementing Operations", IADC/SPE 98970, pp. 1-5, IADC/SPE Drilling Conference; 2006.
Rae et al,, "Liquid Cement Premix Introduces New Solutions to Conventional Cementing Problems", IAEC/SPE 36086, pp. 393-400, IADC/SPE Drilling Conference, 1996.
Rae et al., "Liquid Cement Premix for Improved Abandonment and Workover Operations", SPE 36477, pp. 637-643, SPE, Inc., 1996.
Anderson et al. "New Technology Eliminates Bulking in Cementing Operations", SPE 36478, pp. 645-653, SPE, Inc, 1996.
Anderson et,al., "New Technology Improves Cement Slurry Design", SPE 36973, pp. 127-136, SPE, Inc, 1996.
Shaefer et al., Utilizing 'Over-Seas' Technology Improves the Cementing Processes in the DJ Basin of Colorado!, SPE 80940, pp. 1-8, SPE,Inc., 2003.
"Liquid Stone® Cement Technology", Product Sales Bulletin, BJ Services Company, pp. 1-2, Oct. 19, 2004.
HES brochureMicro Matrix® Cerment Retarder, H01481, Aug. 2007.
HES brochure CFR-3™ Cement Friction Reducer, H01325, Oct. 2005.
Hess Pumice Products, Inc., "Fact Sheet", located at website www.hesspumice.com, printed From Internet Mar. 2012.
PCT Search Report for PCT International Application No. PCT/US2013/029489 dated Apr. 19, 2013.
"Conduction Calorimetric Investigation of the effect of Retarders on the Hydration of Portland Cement", V.S. Ramachandran and M.S. Lowery—Thermochimica Arts, 195 (1992) 373-387.
"Competetive Adsorption of Phosphate and Phosphonates onto Goethite", Bernd Nowack and Alan T. Stone—Water Research 40 (2006) 2201-2209.
"Molecular Modeling of the Mechanism of Action of Phosphonate Retarders on Hydrating Cements," Peter V. Coveney and William Humphries—J. Chem. Soc., Faraday Trans., 1996, 92(5, 831-8411).
Yana, Y., et al. (1996). "Growth and Engineering of Micropourous Zeolite Films and Coatings," MRS Procedings, 431, p. 211.
Malvern Brochure "Zetasizer Nano ZS" dated 2011.
Nissan Chemical Brochure "Snowtex®" dated 2007.
ThermPhos Brochure "Dequest® 2006" printed from the Internet on Mar. 25, 2013.
OFI Testing Equipment, Inc. Brochure "Ultrasonic Cement Analyzer" dated 2013.
HESS Brochure "Pumice Pozz for Well Cements" dated 2013.
BASF Brochure "Oilfeild Chemicals Product Range" dated Jul. 2010.
Halliburton Brochure "Micro Matrix®" dated Nov. 2006.
ThermPhos Brochure "Dequest® 2066" printed from the Internet on Nov. 18, 2013.
Benge, O.G. et al, "Evaluation of Blast Furnace Slag Slurried for Oilfeild Application" SPE 27449, pp. 169-180, SPE, Ince., 1994.
Halliburton Brochure "Baroid" dated Mar. 25, 2010.
Allahverdi, A., et al. (2006). "Chemical activation and set acceleration of line-natural pozzolan cement." Ceramics-Silikaty, 193-199.
Brito, A, et al., (2004). "High surface area support, catalyst derived from natural pumice." Study of pretreatment variables. Ind. Eng. Chem. Res., 443, 1659-1664.
Johnson, C.D. et al, (2007). "Zeolitisation of pumice-micropourous materials on macropourous support structures derived from natural minerals" J. Mat. Chem., 17, 476-484.
Mielenz, R.C, et al., (1950). "Effect of calcination on natural pozzolans." Symposium on use of pozzolanic materials in mortars and concretes (pp. 43-92). ASTM.
Ottana, R. et al., (1982). Hydrothermal synthesis of zeotites from pumice in alkaline and saline environment.r Zeolites, 2,295-298.
Palomo, A. et al., (2011). Alkaline activation, procedure for transforming fly ash into new materials. Part I: Applications. World of Coal Ash (WOCA) Conference (pp. 1-14). Denver, CO: https://www.flyash.info/.
Rebrov, E.V. et al., (2009). "Sol-gel synthesis of zeolite coatings and their application in catalytic microstructured reactors." Catalysis in Industry, 1(4), 322-347.
Saija, L.M. et al., (1983). Zeolization of pumice in ash-sodium salt solutions. Mat. Chem. Phys., 8, 207-216.
Shi, C. (2001). "An overview on the activation reactivity of natural pozzolans." Can J. Civ. Eng., 778-786.
Shvarzman, A. et al., (2001). "Influence of chemical and phase composition of mineral admixtures on their pozzolanic activity." Advances in Cement Research 13(1), 1-7.
Pisklak, T.J. et al, (2004). "Preparation and characterization of mordenite think films via pulsed laser deposition" Journal of Pourous Materials, 11(4), 191-209.
Examination Report for AU Application No. 2018229539, dated Apr. 18, 2019.
Examination Report for AU Application No. 2018232978, dated May 24, 2019.
Canada Office Action for Application No. 2,974,111, dated May 9, 2019.
Malaysian Examination Report for Application No. PI 2015702090 dated May 31, 2019.
Malaysian Examination Report for Application No. PI 2017702445 dated Sep. 28, 2019.
Malaysian Examination Report for Application No. PI 2017702446 dated Sep. 28, 2019.

\* cited by examiner

CEMENT SET ACTIVATORS FOR CEMENT COMPOSITIONS AND ASSOCIATED METHODS

CROSS-REFERENCE TO RELATED APPLICATIONS

This application is a divisional of U.S. patent application Ser. No. 14/048,463, filed on. Oct. 8, 2013, titled "Cement Set Activators for Cement Compositions and Associated Methods," and issued as U.S. Pat. No. 10,082,001 on Sep. 25, 2018, which claims priority to U.S. Provisional Patent Application No. 61/875,231, filed on Sep. 9, 2013, titled "Cement Set Activators for Cement Compositions and Associated Methods" and is a continuation-in-part of U.S. patent application Ser. No. 13/417,001, entitled "Set-Delayed Cement Compositions Comprising Pumice and. Associated. Methods," filed on Mar. 9, 2012, and issued as U.S. Pat. No. 8,851,173 on Oct. 7, 2014, the entire disclosures of which are incorporated herein by reference.

BACKGROUND

The present embodiments relate to subterranean cementing operations and, in certain embodiments, to set-delayed cement compositions and methods of using set-delayed cement compositions in subterranean formations.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string prevents the migration of fluids in the annulus and protects the pipe string from corrosion. Cement compositions may also be used in remedial cementing methods to seal cracks or holes in pipe strings or cement sheaths, to seal highly permeable formation zones or fractures, or to place a cement plug and the like.

A broad variety of cement compositions have been used in subterranean cementing operations. In some instances, set-delayed cement compositions have been used. Set-delayed cement compositions are characterized by remaining in a pumpable fluid state for at least about one day (e.g., about 7 days, about 2 weeks, about 2 years or more) at room temperature (e.g., about 80° F.) in quiescent storage. When desired for use, the set-delayed cement compositions should be capable of activation and consequently develop reasonable compressive strengths. For example, a cement set activator may be added to a set-delayed cement composition to induce the composition to set into a hardened mass. Among other things, set-delayed cement compositions may be suitable for use in wellbore applications such as applications where it is desirable to prepare the cement composition in advance. This may allow the cement composition to be stored prior to use. In addition, this may allow the cement composition to be prepared at a convenient location before transportation to the job site. Accordingly, capital expenditures may be reduced due to a reduction in the need for on-site bulk storage and mixing equipment. This may be particularly useful for offshore cementing operations where space onboard the vessels may be limited.

While set-delayed cement compositions have been developed heretofore, challenges exist with their successful use in subterranean cementing operations. For example, set-delayed cement compositions prepared with Portland cement may have undesired gelation issues which can limit their use and effectiveness in cementing operations. Other set-delayed compositions that have been developed, for example, those comprising hydrated lime and quartz, may be effective in some operations but may have limited use at lower temperatures as they may not develop sufficient compressive strength when used in subterranean formations having lower bottom hole static temperatures. In addition, it may be problematic to activate some set-delayed cement compositions while maintaining acceptable thickening times and compressive strength development.

BRIEF DESCRIPTION OF THE DRAWINGS

These drawings illustrate certain aspects of some of the embodiments of the present methods and compositions, and should not be used to limit or define the methods or compositions.

DETAILED DESCRIPTION

Figure 1:
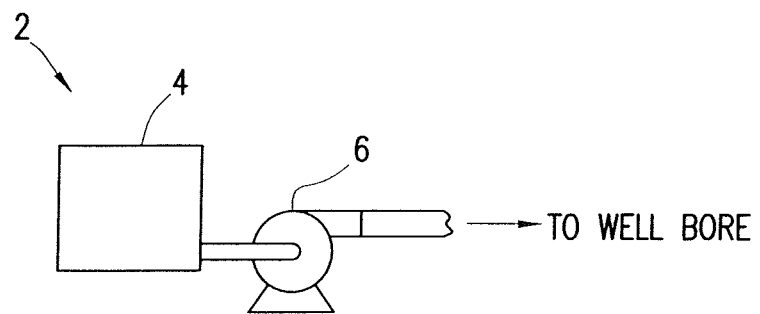
FIG. 1 illustrates a system for preparation and delivery of a cement composition to a wellbore in accordance with certain embodiments.

The present embodiments relate to subterranean cementing operations and, in certain embodiments, to set-delayed cement compositions and methods of using set-delayed cement compositions in subterranean formations. Particular embodiments provide improved cement set activators for the activation of cement compositions comprising pozzolan materials that have been retarded, have long set times, and/or have insufficient early strength.

Embodiments of the set-delayed cement compositions may generally comprise water, a pozzolan, and hydrated lime. Optionally, the cement compositions may further comprise a dispersant and/or a retarder. Advantageously, embodiments of the set-delayed cement compositions may be capable of remaining in a pumpable fluid state for an extended period of time. For example, the set-delayed cement compositions may remain in a pumpable fluid state for at least about 1 day or longer. Advantageously, the set-delayed cement compositions may develop reasonable compressive strengths after activation at relatively low temperatures. While the set-delayed cement compositions may be suitable for a number of subterranean cementing operations, they may be particularly suitable for use in subterranean formations having relatively low bottom hole static temperatures, e.g., temperatures less than about 200° F. or ranging from about 100° F. to about 200° F. In alternative embodiments, the set-delayed cement compositions may be used in subterranean formations having bottom hole static temperatures up to 450° F. or higher.

The water used in embodiments may be from any source provided that it does not contain an excess of compounds that may undesirably affect other components in the set-delayed cement compositions. For example, a cement composition may comprise fresh water or salt water. Salt water generally may include one or more dissolved salts therein and may be saturated or unsaturated as desired for a particular application. Seawater or brines may be suitable for use in embodiments. Further, the water may be present in an amount sufficient to form a pumpable slurry. In certain embodiments, the water may be present in the set-delayed cement compositions in an amount in the range of from about 33% to about 200% by weight of the pozzolan. In certain embodiments, the water may be present in the set-delayed cement compositions in an amount in the range of from about 35% to about 70% by weight of the pozzolan. With the benefit of this disclosure one of ordinary skill in the art will recognize the appropriate amount of water for a chosen application.

Embodiments of the set-delayed cement compositions may comprise a pozzolan. Any pozzolan is suitable for use in embodiments. Example embodiments comprising a pozzolan may comprise fly ash, silica fume, metakaolin, a natural pozzolan (e.g., pumice), or combinations thereof.

An example of a suitable pozzolan may comprise fly ash. A variety of fly ash may be suitable, including fly ash classified as Class C and Class F fly ash according to American Petroleum Institute, API Specification for Materials and Testing for Well Cements, API Specification 10, Fifth Ed., Jul. 1, 1990. Class C fly ash comprises both silica and lime, so it may set to form a hardened mass upon mixing with water. Class F fly ash generally does not contain a sufficient amount of lime to induce a cementitious reaction, therefore, an additional source of calcium ions is necessary for a set-delayed cement composition comprising Class F fly ash. In some embodiments, lime may be mixed with Class F fly ash in an amount in the range of about 0.1% to about 100% by weight of the fly ash. In some instances, the lime may be hydrated lime. Suitable examples of fly ash include, but are not limited to, POZMIX® A cement additive, commercially available from Halliburton Energy Services, Inc., Houston, Tex.

An example of a suitable pozzolan may comprise metakaolin. Generally, metakaolin is a white pozzolan that may be prepared by heating kaolin clay to temperatures in the range of about 600° to about 800° C.

An example of a suitable pozzolan may comprise a natural pozzolan. Natural pozzolans are generally present on the Earth's surface and set and harden in the presence of hydrated lime and water. Embodiments comprising a natural pozzolan may comprise pumice, diatomaceous earth, volcanic ash, opaline shale, tuff, and combinations thereof. The natural pozzolans may be ground or unground. Generally, the natural pozzolans may have any particle size distribution as desired for a particular application. In certain embodiments, the natural pozzolans may have a mean particle size in a range of from about 1 micron to about 200 microns. The mean particle size corresponds to d50 values as measured by particle size analyzers such as those manufactured by Malvern Instruments, Worcestershire, United Kingdom. In specific embodiments, the natural pozzolans may have a mean particle size in a range of from about 1 micron to about 200 micron, from about 5 microns to about 100 microns, or from about 10 micron to about 50 microns. In one particular embodiment, the natural pozzolans may have a mean particle size of less than about 15 microns. An example of a suitable commercial natural pozzolan is pumice available from Hess Pumice Products, Inc., Malad, Id., as DS-325 lightweight aggregate, which has a particle size of less than about 15 microns. It should be appreciated that particle sizes too small may have mixability problems while particle sizes too large may not be effectively suspended in the compositions and may be less reactive due to their decreased surface area. One of ordinary skill in the art, with the benefit of this disclosure, should be able to select a particle size for the natural pozzolans suitable for use for a chosen application.

Embodiments of the set-delayed cement compositions may comprise hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in embodiments of the cement compositions, for example, to form a hydraulic composition with the pozzolan. For example, the hydrated lime may be included in a pozzolan-to-hydrated-lime weight ratio of about 10:1 to about 1:1 or a ratio of about 3:1 to about 5:1. Where present, the hydrated lime may be included in the set-delayed cement compositions in an amount in the range of from about 10% to about 100% by weight of the pozzolan, for example. In some embodiments, the hydrated lime may be present in an amount ranging between any of and/or including any of about 10%, about 20%, about 40%, about 60%, about 80%, or about 100% by weight of the pozzolan. In some embodiments, the cementitious components present in the set-delayed cement composition may consist essentially of the pozzolan and the hydrated lime. For example, the cementitious components may primarily comprise the pozzolan and the hydrated lime without any additional cementitious components (e.g., Portland cement) that hydraulically set in the presence of water. One of ordinary skill in the art, with the benefit of this disclosure, will recognize the appropriate amount of hydrated lime to include for a chosen application.

Embodiments of the set-delayed cement compositions may comprise a set retarder. A broad variety of set retarders may be suitable for use in the set-delayed cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, or mixtures thereof. Examples of suitable set retarders include, among others, phosphonic acid derivatives. One example of a suitable set retarder is Micro Matrix® cement retarder, available from Halliburton Energy Services, Inc. Generally, the set retarder may be present in the set-delayed cement compositions in an amount sufficient to delay the setting for a desired time. In some embodiments, the set retarder may be present in the set-delayed cement compositions in an amount in the range of from about 0.01% to about 10% by weight of the pozzolan. In specific embodiments, the set retarder may be present in an amount ranging between any of and/or including any of about 0.01%, about 0.1%, about 1%, about 2%, about 4%, about 6%, about 8%, or about 10% by weight of the pozzolan. One of ordinary skill in the art, with the benefit of this disclosure, will recognize the appropriate amount of the set retarder to include for a chosen application.

As previously mentioned, embodiments of the set-delayed cement compositions may optionally comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment® 514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex. The Liquiment® 514L dispersant may comprise 36% by weight of the polycarboxylated ether in water. While a variety of dispersants may be used in accordance with embodiments, polycarboxylated ether dispersants may be particularly suitable for use in some embodiments. Without being limited by theory, it is believed that polycarboxylated ether dispersants may synergistically interact with other components of the set-delayed cement composition. For example, it is believed that the polycarboxylated ether dispersants may react with certain set retarders (e.g., phosphonic acid derivatives) resulting in formation of a gel that suspends the pozzolan and hydrated lime in the composition for an extended period of time.

In some embodiments, the dispersant may be included in the set-delayed cement compositions in an amount in the range of from about 0.01% to about 5% by weight of the pozzolan. In specific embodiments, the dispersant may be present in an amount ranging between any of and/or including any of about 0.01%, about 0.1%, about 0.5%, about 1%, about 2%, about 3%, about 4%, or about 5% by weight of the pozzolan. One of ordinary skill in the art, with the benefit of this disclosure, will recognize the appropriate amount of the dispersant to include for a chosen application.

Some embodiments of the set-delayed cement compositions may comprise silica sources in addition to the pozzolan; for example, crystalline silica and/or amorphous silica. Crystalline silica is a powder that may be included in embodiments of the set-delayed cement compositions, for example, to prevent cement compressive strength retrogression. Amorphous silica is a powder that may be included in embodiments of the set-delayed cement compositions as a lightweight filler and/or to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process. An example of a suitable source of amorphous silica is Silicalite™ cement additive available from Halliburton Energy Services, Inc., Houston, Tex. Embodiments comprising additional silica sources may utilize the additional silica source as needed to enhance compressive strength or set times.

Other additives suitable for use in subterranean cementing operations also may be included in embodiments of the set-delayed cement compositions. Examples of such additives include, but are not limited to: weighting agents, lightweight additives, gas-generating additives, mechanical-property-enhancing additives, lost-circulation materials, filtration-control additives, fluid-loss-control additives, defoaming agents, foaming agents, thixotropic additives, and combinations thereof. In embodiments, one or more of these additives may be added to the set-delayed cement compositions after storing but prior to the placement of a set-delayed cement composition into a subterranean formation. A person having ordinary skill in the art, with the benefit of this disclosure, should readily be able to determine the type and amount of additive useful for a particular application and desired result.

Those of ordinary skill in the art will appreciate that embodiments of the set-delayed cement compositions generally should have a density suitable for a particular application. By way of example, the cement compositions may have a density in the range of from about 4 pounds per gallon ("lb/gal") to about 20 lb/gal. In certain embodiments, the cement compositions may have a density in the range of from about 8 lb/gal to about 17 lb/gal. Embodiments of the set-delayed cement compositions may be foamed or unfoamed or may comprise other means to reduce their densities, such as hollow microspheres, low-density elastic beads, or other density-reducing additives known in the art. In embodiments, the density may be reduced after storage, but prior to placement in a subterranean formation. In embodiments, weighting additives may be used to increase the density of the set-delayed cement compositions. Examples of suitable weighting additives may include barite, hematite, hausmannite, calcium carbonate, siderite, ilmenite, or combinations thereof. In particular embodiments, the weighting additives may have a specific gravity of 3 or greater. Those of ordinary skill in the art, with the benefit of this disclosure, will recognize the appropriate density for a particular application.

As previously mentioned, the set-delayed cement compositions may have a delayed set in that they remain in a pumpable fluid state for at least one day (e.g., at least about 1 day, about 2 weeks, about 2 years or more) at room temperature (e.g., about 80° F.) in quiescent storage. For example, the set-delayed cement compositions may remain in a pumpable fluid state for a period of time from about 1 day to about 7 days or more. In some embodiments, the set-delayed cement compositions may remain in a pumpable fluid state for at least about 1 day, about 7 days, about 10 days, about 20 days, about 30 days, about 40 days, about 50 days, about 60 days, or longer. A fluid is considered to be in a pumpable fluid state where the fluid has a consistency of less than 70 Bearden units of consistency ("Bc"), as measured on a pressurized consistometer in accordance with the procedure for determining cement thickening times set forth in API RP Practice 10B-2, *Recommended Practice for Testing Well Cements*, First Edition, July 2005.

When desired for use, embodiments of the set-delayed cement compositions may be activated (e.g., by combination with an activator) to set into a hardened mass. The term "cement set activator" or "activator", as used herein, refers to an additive that activates a set-delayed or heavily retarded cement composition and may also accelerate the setting of the set-delayed, heavily retarded, or other cement composition. By way of example, embodiments of the set-delayed cement compositions may be activated to form a hardened mass in a time period in the range of from about 1 hour to about 12 hours. For example, embodiments of the set-delayed cement compositions may set to form a hardened mass in a time period ranging between any of and/or including any of about 1 day, about 2 days, about 4 days, about 6 days, about 8 days, about 10 days, or about 12 days.

In some embodiments, the set-delayed cement compositions may set to have a desirable compressive strength after activation. Compressive strength is generally the capacity of a material or structure to withstand axially directed pushing forces. The compressive strength may be measured at a specified time after the set-delayed cement composition has been activated and the resultant composition is maintained under specified temperature and pressure conditions. Compressive strength can be measured by either destructive or non-destructive methods. The destructive method physically tests the strength of treatment fluid samples at various points in time by crushing the samples in a compression-testing machine. The compressive strength is calculated from the failure load divided by the cross-sectional area resisting the load and is reported in units of pound-force per square inch (psi). Non-destructive methods may employ a UCA™ ultrasonic cement analyzer, available from Fann Instrument Company, Houston, Tex. Compressive strength values may be determined in accordance with API RP 10B-2, *Recommended Practice for Testing Well Cements*, First Edition, July 2005.

By way of example, the set-delayed cement compositions may develop a 24-hour compressive strength in the range of from about 50 psi to about 5000 psi, alternatively, from about 100 psi to about 4500 psi, or alternatively from about 500 psi to about 4000 psi. In some embodiments, the set-delayed cement compositions may develop a compressive strength in 24 hours of at least about 50 psi, at least about 100 psi, at least about 500 psi, or more. In some embodiments, the compressive strength values may be determined using destructive or non-destructive methods at a temperature ranging from 100° F. to 200° F.

In some embodiments, the set-delayed cement compositions may have desirable thickening times after activation. Thickening time typically refers to the time a fluid, such as a set-delayed cement composition, remains in a fluid state capable of being pumped. A number of different laboratory techniques may be used to measure thickening time. A pressurized consistometer, operated in accordance with the procedure set forth in the aforementioned API RP Practice 10B-2, may be used to measure whether a fluid is in a pumpable fluid state. The thickening time may be the time for the treatment fluid to reach 70 Bc and may be reported as the time to reach 70 Bc. In some embodiments, the cement compositions may have a thickening time of greater than about 1 hour, alternatively, greater than about 2 hours, alternatively greater than about 5 hours at 3,000 psi and temperatures in a range of from about 50° F. to about 400° F., alternatively, in a range of from about 80° F. to about 250° F., and alternatively at a temperature of about 140° F.

Embodiments may include the addition of a cement set activator to the set-delayed cement compositions. Examples of suitable cement set activators include, but are not limited to: zeolites, amines such as triethanolamine, diethanolamine; silicates such as sodium silicate; zinc formate; calcium acetate; Groups IA and IIA hydroxides such as sodium hydroxide, magnesium hydroxide, and calcium hydroxide; monovalent salts such as sodium chloride; divalent salts such as calcium chloride; nanosilica (i.e., silica having a particle size of less than or equal to about 100 nanometers); polyphosphates; and combinations thereof. In some embodiments, a combination of the polyphosphate and a monovalent salt may be used for activation. The monovalent salt may be any salt that dissociates to form a monovalent cation, such as sodium and potassium salts. Specific examples of suitable monovalent salts include potassium sulfate, and sodium sulfate. A variety of different polyphosphates may be used in combination with the monovalent salt for activation of the set-delayed cement compositions, including polymeric metaphosphate salts, phosphate salts, and combinations thereof. Specific examples of polymeric metaphosphate salts that may be used include sodium hexametaphosphate, sodium trimetaphosphate, sodium tetrametaphosphate, sodium pentametaphosphate, sodium heptametaphosphate, sodium octametaphosphate, and combinations thereof. A specific example of a suitable cement set activator comprises a combination of sodium sulfate and sodium hexametaphosphate. In particular embodiments, the activator may be provided and added to the set-delayed cement composition as a liquid additive, for example, a liquid additive comprising a monovalent salt, a polyphosphate, and optionally a dispersant.

As discussed above, zeolites may be included as activators in embodiments of the set-delayed cement compositions. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite. An example of a suitable source of zeolite is Valfor-100® zeolite or Advera® 401 zeolite available from the PQ Corporation, Malvern, Pa.

Embodiments of the set-delayed cement compositions may comprise a cement set activator comprising a zeolite, a combination of zeolites, a combination of zeolite and a non-zeolite activator, a combination of zeolites and a non-zeolite activator, a combination of zeolites and a combination of non-zeolite activators, or combinations thereof. Embodiments comprising zeolite may comprise any zeolite. Examples of zeolites include mordenite, zsm-5, zeolite x, zeolite y, zeolite a, etc. Furthermore, embodiments comprising zeolite may comprise zeolite in combination with a cation such as $Na^+$, $K^+$, $Ca^{2+}$, $Mg^{2+}$, etc. Zeolites comprising cations such as sodium may also provide additional cation sources to the set-delayed cement composition as the zeolites dissolve. An example of a zeolite comprising a cation (e.g., $Na^+$) is the afore-mentioned Valfor® 100 zeolite. Without being limited by theory, it is believed that zeolites increase the surface area of the pozzolan without increasing their particles size. Increased surface areas for the pozzolan may allow for a faster dissolution rate of silica, the free silica is able to react with calcium species, such as those from hydrated lime, to form calcium-silicate-hydrate gels. Increasing the surface area without altering the particle size is advantageous because it allows for greater reactivity without affecting other properties such as viscosity or pumpability. Sodium zeolites may also exchange sodium for calcium in solution thereby increasing the pH and increasing the rate of dissolution of silica in the slurry.

Zeolites may be added to the set-delayed cement compositions in a number of ways. One embodiment comprises a method wherein the zeolites are added directly to the set-delayed cement compositions in an amount sufficient to activate or accelerate the setting of the cement composition. An alternative embodiment is to induce the growth of the zeolite crystals directly on the pozzolan. The pozzolan may be a nutrient source for zeolite crystals and be induced to grow zeolite crystals either as a film or as an integral part of the particle if the pozzolanic particles were placed under zeolite synthesis conditions. Various seeding methods such as pulsed laser deposition, secondary growth, vacuum deposition, etc. may be used to produce a variety of zeolites (e.g., zsm-5, zeolite x, etc.) on the pozzolan. The synthesized zeolites may form crystals, film, and/or integrate directly into the pozzolan. The pozzolan with the zeolite disposed thereon may be provided and used in preparation of a set-delayed cement composition.

The cement set activator should be added to embodiments of the set-delayed cement composition in an amount sufficient to induce the set-delayed composition to set into a hardened mass. In certain embodiments, the cement set activator may be added to the cement composition in an amount in the range of about 0.1% to about 20% by weight of the pozzolan. In specific embodiments, the cement set activator may be present in an amount ranging between any of and/or including any of about 0.1%, about 1%, about 5%, about 10%, about 15%, or about 20% by weight of the pozzolan. One of ordinary skill in the art, with the benefit of this disclosure, will recognize the appropriate amount of the cement set activator to include for a chosen application.

While the preceding may describe the use of zeolites as activators in set-delayed cement compositions, it is to be understood that zeolites may be used in other cement systems comprising a pozzolan to accelerate the set time of the cement composition and to enhance the development of early compressive strength. In some embodiments, a zeolite may be used in a cement composition comprising a pozzolan and water. In other embodiments, the cement composition may further comprise hydrated lime and other optional additives, such as those described above. The disclosure of the zeolite used herein is not to be limited to set-delayed pozzolan cement compositions but may be used for any pozzolan cement composition regardless of whether the cement composition may be categorized as "set-delayed."

As will be appreciated by those of ordinary skill in the art, embodiments of the set-delayed cement compositions may be used in a variety of subterranean operations, including primary and remedial cementing. In some embodiments, a set-delayed cement composition may be provided that comprises water, a pozzolan, hydrated lime, a set retarder, and optionally a dispersant. The set-delayed cement composition may be introduced into a subterranean formation and allowed to set therein. As used herein, introducing the set-delayed cement composition into a subterranean formation includes introduction into any portion of the subterranean formation, including, without limitation, into a wellbore drilled into the subterranean formation, into a near wellbore region surrounding the wellbore, or into both. Embodiments may further include activation of the set-delayed cement composition. The activation of the set-delayed cement composition may comprise, for example, the addition of a cement set activator to the set-delayed cement composition.

In some embodiments, a set-delayed cement composition may be provided that comprises water, a pozzolan, hydrated lime, a set retarder, and optionally a dispersant. The set-delayed cement composition may be stored, for example, in a vessel or other suitable container. The set-delayed cement composition may be permitted to remain in storage for a desired time period. For example, the set-delayed cement composition may remain in storage for a time period of about 1 day or longer. For example, the set-delayed cement composition may remain in storage for a time period of about 1 day, about 2 days, about 5 days, about 7 days, about 10 days, about 20 days, about 30 days, about 40 days, about 50 days, about 60 days, or longer. In some embodiments, the set-delayed cement composition may remain in storage for a time period in a range of from about 1 day to about 7 days or longer. Thereafter, the set-delayed cement composition may be activated, for example, by addition of a cement set activator, introduced into a subterranean formation, and allowed to set therein.

In primary cementing embodiments, for example, embodiments of the set-delayed cement composition may be introduced into an annular space between a conduit located in a wellbore and the walls of a wellbore (and/or a larger conduit in the wellbore), wherein the wellbore penetrates the subterranean formation. The set-delayed cement composition may be allowed to set in the annular space to form an annular sheath of hardened cement. The set-delayed cement composition may form a barrier that prevents the migration of fluids in the wellbore. The set-delayed cement composition may also, for example, support the conduit in the wellbore.

In remedial cementing embodiments, a set-delayed cement composition may be used, for example, in squeeze-cementing operations or in the placement of cement plugs. By way of example, the set-delayed composition may be placed in a wellbore to plug an opening (e.g., a void or crack) in the formation, in a gravel pack, in the conduit, in the cement sheath, and/or between the cement sheath and the conduit (e.g., a microannulus).

An embodiment comprises a method of cementing in a subterranean formation comprising: providing a cement composition comprising water, a pozzolan, hydrated lime, and a zeolite activator; introducing the cement composition into a subterranean formation; and allowing the cement composition to set in the subterranean formation, wherein the zeolite activator accelerates compressive strength development of the cement composition An embodiment comprises an activated set-delayed cement composition comprising: water, a pozzolan, hydrated lime, a set retarder, and a zeolite activator.

An embodiment comprises a cementing system comprising: a set-delayed cement composition comprising water, a pozzolan, hydrated lime, and a set retarder; a zeolite activator for activation of the set-delayed cement composition; mixing equipment for mixing the set-delayed cement composition and the zeolite activator to form an activated cement composition; and pumping equipment for delivering the activated cement composition into a wellbore.

Referring now to FIG. 1, preparation of a cement composition (which may be set delayed or non-set delayed) in accordance with example embodiments will now be described. FIG. 1 illustrates a system 2 for preparation of a cement composition and delivery to a wellbore in accordance with certain embodiments. As shown, the cement composition may be mixed in mixing equipment 4, such as a jet mixer, re-circulating mixer, or a batch mixer, for example, and then pumped via pumping equipment 6 to the wellbore. In some embodiments, the mixing equipment 4 and the pumping equipment 6 may be disposed on one or more cement trucks as will be apparent to those of ordinary skill in the art. In some embodiments, a jet mixer may be used, for example, to continuously mix the lime/settable material with the water as it is being pumped to the wellbore. In set-delayed embodiments, a re-circulating mixer and/or a batch mixer may be used to mix the set-delayed cement composition, and the activator may be added to the mixer as a powder prior to pumping the cement composition downhole.

Figure 2A:
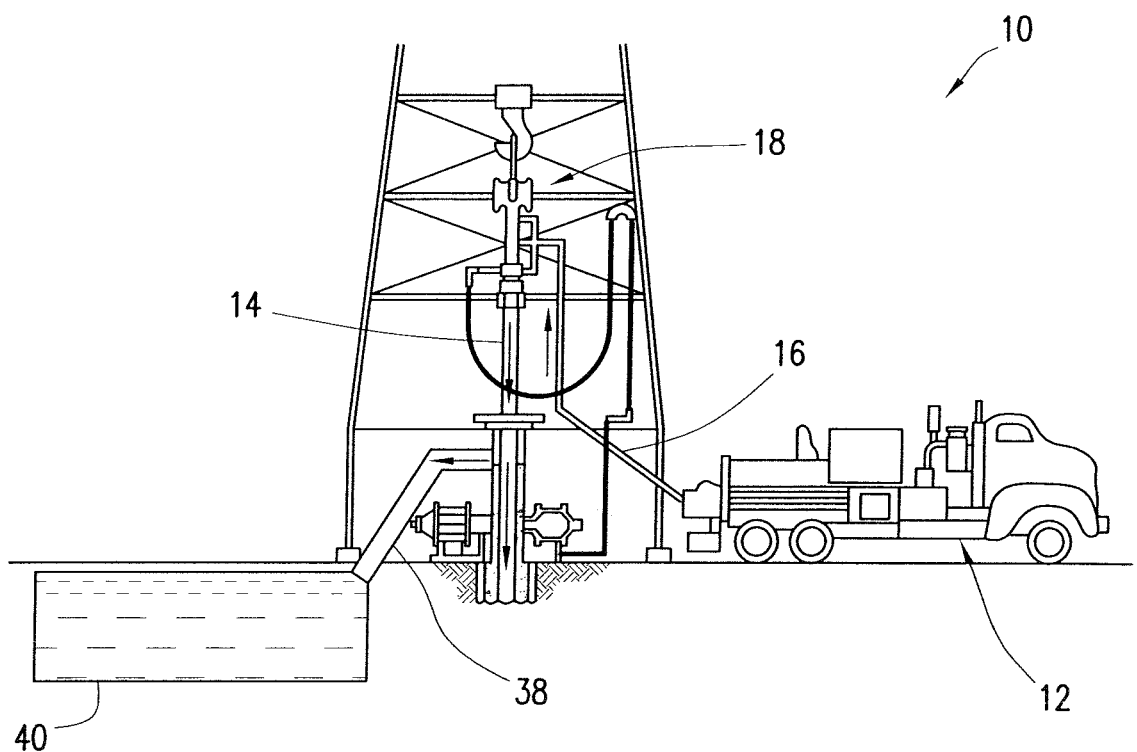
FIG. 2A illustrates surface equipment that may be used in placement of a cement composition in a wellbore in accordance with certain embodiments.

An example technique for placing a cement composition into a subterranean formation will now be described with reference to FIGS. 2A and 2B. FIG. 2A illustrates surface equipment 10 that may be used in placement of a cement composition in accordance with certain embodiments. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing equipment 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
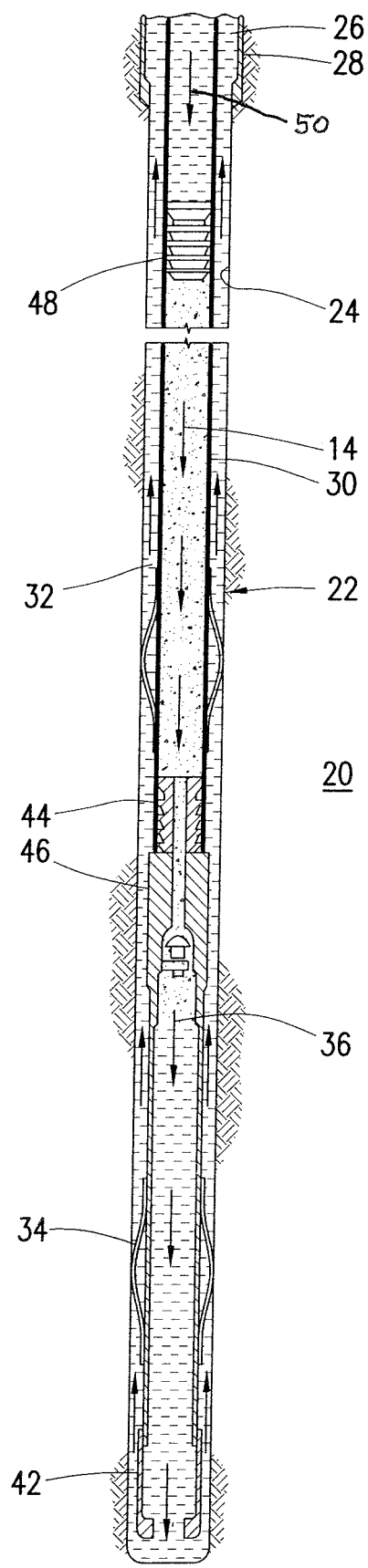
FIG. 2B illustrates placement of a cement composition into a wellbore annulus in accordance with certain embodiments.

Turning now to FIG. 2B, the set-delayed or non-set-delayed pozzolanic cement composition 14 may be placed into a subterranean formation 20 in accordance with example embodiments. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated embodiment, a surface casing 26 has been inserted into the wellbore 22. The surface casing 26 may be cemented to the walls 24 of the wellbore 22 by cement sheath 28. In the illustrated embodiment, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the pozzolanic cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the pozzolanic cement composition 14 through the bottom plug 44. In FIG. 2B, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

The exemplary cement compositions disclosed herein may directly or indirectly affect one or more components or pieces of equipment associated with the preparation, delivery, recapture, recycling, reuse, and/or disposal of the disclosed cement compositions. For example, the disclosed cement compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cement compositions. The disclosed cement compositions may also directly or indirectly affect any transport or delivery equipment used to convey the cement compositions to a well site or downhole such as, for example, any transport vessels, conduits, pipelines, trucks, tubulars, and/or pipes used to compositionally move the cement compositions from one location to another, any pumps, compressors, or motors (e.g., topside or downhole) used to drive the cement compositions into motion, any valves or related joints used to regulate the pressure or flow rate of the cement compositions, and any sensors (i.e., pressure and temperature), gauges, and/or combinations thereof, and the like. The disclosed cement compositions may also directly or indirectly affect the various downhole equipment and tools that may come into contact with the cement compositions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the embodiments, the following examples of certain aspects of some embodiments are given. In no way should the following examples be read to limit, or define, the entire scope of the disclosure.

EXAMPLES

Example 1

Four samples were prepared to test the effectiveness of sodium zeolite A as an activator of lime-pozzolan cement compositions. The sodium zeolite A used for the experiment was Valfor® 100 zeolite from the PQ Corporation, Malvern, Pa. Valfor® 100 zeolite has a median particle size of 5 microns and a high surface area (i.e., 71.4 $m^2/g$). Two lime-pozzolan cement formulations were prepared with and without sodium zeolite A. The formulation with sodium zeolite A had a density of 14.0 lb/gal and was comprised of 304 grams of pumice (DS-325 lightweight aggregate), 45 grams of hydrated lime, 25 grams of sodium zeolite A (Valfor® 100), 1.9 grams of dispersant (Liquiment® 5581F dispersant), and 158.5 grams of water. The formulation without sodium zeolite A had a density of 14.0 lb/gal and was comprised of 304 grams of pumice (DS-325 lightweight aggregate), 45 grams of hydrated lime, 1.9 grams of dispersant (Liquiment® 5581F), and 145.5 grams of water. The strength development of the samples was monitored via a Fann® UCA™ ultrasonic cement analyzer at test temperatures of 80° F. and 100° F. The UCA™ was used to determine the compressive strengths of the samples after twenty-four hours as well as the time for the samples to develop compressive strengths of 50 psi and 500 psi. The UCA™ determines the compressive strength rate as a function of time. The rate of strength development was calculated as the slope of the initial linear part (starting from the onset of the strength development) of the compressive strength versus time graph. The results of these tests are set forth in Table 1 below.

TABLE 1

Comparison of Lime-Pozzolan Cement with and without a Zeolite Activator

| Test Temperature | Zeolite (% by weight of pumice + hydrated lime) | Time to 50 psi (hr:min) | Time to 500 psi (hr:min) | 24-Hour Compressive Strength (psi) |
|---|---|---|---|---|
| 80° F. | 7.20% | 4:23 | 17:10 | 688 |
| 80° F. | 0.00% | 20:03 | — | 69 |
| 100° F. | 7.20% | 2:41 | 8:30 | 1562 |
| 100° F. | 0.00% | 7:22 | 29:30 | 374 |

Example 2

A sample of pumice was treated with sodium hydroxide and sodium chloride to produce zeolite on the pumice. The zeolite synthesis was carried out by mixing 300 grams of pumice (DS-325 lightweight aggregate) with 1.25 liters of 30% NaCl solution that contained 25 grams of NaOH. After mixing was completed, the sample was placed in a sealed plastic container and heated at 85° C. for 17 hours. After treatment, the solids were filtered and washed several times with deionized water and then dried. The solids were used to form a lime-pozzolan set-delayed cement composition comprising 250 grams of zeolitized pumice, 50 grams of hydrated lime, 3.49 grams of dispersant (Liquiment® 514L dispersant), 3.13 grams of set retarder (Micro Matrix® cement retarder), and 207.4 grams of water. As a control, a lime-pozzolan set-delayed cement composition was prepared that did not comprise the zeolitized pumice. The control composition comprised 250 grams pumice (DS-325 lightweight aggregate), 50 grams of hydrated lime, 3.49 grams of dispersant (Liquiment® 514L dispersant), 3.13 grams of set retarder (Micro Matrix® cement retarder), and 154.9 grams of water. The strength development of the samples was monitored via UCA™ at a test temperature of 100° F. The UCA™ was used to determine the compressive strengths of the experimental sample and the control after seventy-two hours as well as the time for the experimental sample and the control to develop compressive strengths of 50 psi and 100 psi. The UCA™ determines the compressive strength rate as a function of time. The rate of strength development was calculated as the slope of the initial linear part (starting from the onset of the strength development) of the compressive strength versus time graph. The results of these tests are set forth in Table 2 below.

TABLE 2

Comparison of Lime-Pozzolan Cement with and without a Zeolitized Pumice Activator

| Test Temperature | Pozzolan | Time to 50 psi (hr:min) | Time to 100 psi (hr:min) | 72-Hour Compressive Strength (psi) |
|---|---|---|---|---|
| 100° F. | Zeolitized pumice | 58:45 | 62:24 | 331 |
| 100° F. | pumice | — | — | —* |

*After 78 hours the slurry had not set.

Example 3

Several samples of set-delayed cement compositions were prepared. The samples comprised pumice (DS-325 lightweight aggregate), 20% hydrated lime, and 60% water. The density of each sample was 13.5 lb/gal. In addition to the base composition, a varying amount of dispersant (Liquiment® 5581F dispersant), cement retarder (Micro Matrix® cement retarder), and activator (activator type varied by sample) were added to individual samples. The activator types chosen were sodium zeolite A (Valfor® 100 zeolite), hydrated sodium zeolite A (Advera® 401 zeolite), divalent salt (CaCl$_2$), and cement (API Class A). The dispersant was added as a percentage by weight of the pumice (bwoP). The cement retarder was added in units of gallons per 46 lb. sack of pumice (gal/sk). Each activator comprised 10% of the samples by weight of the pumice and the hydrated lime (bwoP+HL). The strength development and initial set times of the samples were monitored via UCA™ at a test temperature of 80° F. The UCA™ was used to determine the compressive strengths of the experimental sample and the control after twenty-four hours. The UCA™ determines the compressive strength rate as a function of time. The rate of strength development was calculated as the slope of the initial linear part (starting from the onset of the strength development) of the compressive strength versus time graph. The results of these tests are set forth in Table 3 below.

TABLE 3

Comparison of Different Types of Activators

| | | Activator | UCA ™ Data | |
|---|---|---|---|---|
| Dispersant (% bwop) | Cement Retarder (gal/sk) | (10% bwoP + HL) | Initial Set (hr:min) | 24-Hour Compressive Strength (psi) |
| 0.575 | 0.015 | Zeolite NaA | 12:09 | 524 (316)*; tested same day as mixed |
| 0.625 | 0.015 | Zeolite NaA | 7:03 | 778 (343)*; tested one day after mixing |
| 0.625 | 0.015 | Hydrated Zeolite NaA | 7:56 | 603 |
| 0.725 | 0.015 | CaCl$_2$ | 53:52 | — |
| 0.725 | 0.015 | Cement | 15:33 | 71 |
| 0.50 | 0.020 | Zeolite NaA | 11:46 | 580 (230)* |
| 0.55 | 0.025 | Zeolite NaA | 24:43 | 250 psi at 30:30 500 psi at 36:05 |
| 0.55 | 0.025 | Zeolite NaA | (100° F.) 11:20 | 965 (678)* |

*Values in parentheses are crush values for UCA ™ samples.

Example 4

Two set-delayed cement composition samples were prepared. The samples comprised pumice (DS-325 lightweight aggregate), 20% hydrated lime, 65% water, 2% weight additive (Micromax® weight additive), 0.6% dispersant (Liquiment® 5581F dispersant), and 0.04 gal/sk cement retarder (Micro Matrix® cement retarder). Additionally, one experimental sample comprised 10% bwoP+HL sodium zeolite A activator (Valfor® 100 zeolite). The density of each sample was 13.5 lb/gal. The strength development of the samples was monitored via UCA™ at a test temperature of 100° F. The UCA™ was used to determine the time to 50 psi and the time to 500 psi of the experimental sample and the control. The UCA™ determines the compressive strength rate as a function of time. The rate of strength development was calculated as the slope of the initial linear part (starting from the onset of the strength development) of the compressive strength versus time graph. The results of these tests are set forth in Table 4 below.

TABLE 4

Comparison of Lime-Pozzolan Cement with and without a Zeolite Activator

| Activator | UCA ™ Data | |
|---|---|---|
| (10% bwoP + HL) | Time to 50 psi (hr:min) | Time to 500 psi (hr:min) |
| — | 50:00+* | — |
| Zeolite NaA | 38:25 | 56:65 |

*Had not set by 50 hours.

Example 5

Seven experimental samples of set-delayed cement compositions were prepared. The samples comprised 609 grams fly ash (Magnablend Class F fly ash, available from Magnablend Inc., Waxahachie, Tex.), 21 grams silica fume, 3.5 grams cement friction reducer (CFR-3™ cement friction reducer, available from Halliburton Energy Services Inc., Houston, Tex.), and 317 grams water. In addition to the base composition, a varying amount of hydrated sodium zeolite A activator (Advera® 401 zeolite) was added to each experimental sample. The strength development of the samples was monitored via UCA™ at a test temperature of 150° F. The UCA™ was used to determine the compressive strengths of the experimental samples after twenty-four hours. The UCA™ determines the compressive strength rate as a function of time. The rate of strength development was calculated as the slope of the initial linear part (starting from the onset of the strength development) of the compressive strength versus time graph. The results of these tests are set forth in Table 5 below.

TABLE 5

Zeolite Concentration versus Compressive Strength

| Zeolite Activator (grams) | 24-Hour Compressive Strength at 150° F. (psi) |
|---|---|
| 49 | 1220 |
| 42 | 990 |
| 35 | 1140 |
| 28 | 1110 |
| 14 | 980 |
| 7 | 1090 |
| 0 | 1010 |

Additionally the strength development of the zeolite sample comprising 49 grams from Table 5 above, was additionally measured by the UCA™ at test temperatures of 100° F. and 120° F. The results of these tests are set forth in Table 6 below.

TABLE 6

Zeolite concentration versus Compressive Strength at 100° F., 120° F., and 150° F.

| Zeolite Activator (grams) | 24 Hour Comp. Strength at 100° F. (psi) | 24-hour Comp. Strength at 120° F. (psi) | 24-Hour Comp. Strength at 150° F. (psi) |
|---|---|---|---|
| 49 | 620 | 770 | 1220* |
| 0 | Did Not Set | 60 | 1010 |

*Permeability 0.013 md

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, and they may be modified and practiced in different but equivalent manners apparent to those skilled in the art having the benefit of the teachings herein. Although individual embodiments are discussed, all combinations of all those embodiments are covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of those embodiments. If there is any conflict in the usages of a word or terra in this specification and one or more patent(s) or other documents that may be incorporated herein by reference, the definitions that are consistent with this specification should be adopted.

What is claimed is:

1. An activated set-delayed cement composition comprising:
water,
a pozzolan, wherein the pozzolan is selected from the group consisting of: fly ash, silica fume, metakaolin, pumice, and any combination thereof;
hydrated lime,
a set retarder, and
a zeolite activator comprising zeolitized pumice.

2. The composition of claim 1 wherein the zeolite activator is present in an amount in the range of about 0.1% to about 20% by weight of the pozzolan.

3. The composition of claim 1 wherein the set retarder comprises a phosphonic acid derivative, and wherein the activated set-delayed cement composition further comprises a polycarboxylated ether dispersant.

4. The composition of claim 1, wherein the zeolitized pumice is present in an amount that is 5 times an amount of the hydrated lime.

5. A method of making a cement comprising:
storing a set-delayed cement composition comprising water, a pozzolan, hydrated lime, and a set retarder for at least about one day; and
adding a zeolite activator to the set-delayed cement composition after the step of storing to activate the set-delayed cement composition, the zeolite activator comprising zeolitized pumice;
wherein the pozzolan is selected from the group consisting of: fly ash, silica fume, metakaolin, pumice, and any combination thereof.

6. The method of claim 5 further comprising storing the set-delayed cement composition for at least about 7 days prior to adding the zeolite activator.

7. The method of claim 5 wherein the zeolite activator comprises a zeolite in combination with a cation.

8. The method of claim 5 wherein the zeolite activator comprises a zeolite present on a surface of the pozzolan.

9. The method of claim 5 wherein the zeolite activator is present in an amount in the range of about 0.1% to about 20% by weight of the pozzolan.

10. The method of claim 5 wherein the set retarder comprises at least one retarder selected from the group consisting of a phosphonic acid, a phosphonic acid derivative, a lignosulfonate, a salt, an organic acid, a cellulose derivate, a synthetic co- or ter-polymer comprising sulfonate and carboxylic acid groups, a borate compound, and any combination thereof.

11. The method of claim 5 wherein the set-delayed cement composition further comprises a dispersant.

12. The method of claim 11 wherein the dispersant comprises at least one dispersant selected from the group consisting of a sulfonated-formaldehyde-based dispersant, a polycarboxylated ether dispersant, and a combination thereof.

13. The method of claim 5 wherein the set-delayed cement composition further comprises a phosphonic acid derivative cement set retarder and a polycarboxylated ether dispersant.

14. The method of claim 5, wherein the zeolitized pumice is present in an amount that is 5 times an amount of the hydrated lime.

15. The method of claim 5, wherein the set-delayed cement composition is introduced into a subterranean formation by a process comprising pumping the set-delayed cement composition through a conduit, through a casing shoe, and into a wellbore annulus.

* * * * *